Oct. 20, 1936.  L. SIMON  2,058,185
SYSTEM FOR ABSORBING THE VIBRATIONS PRODUCED BY A MACHINE
Filed Dec. 29, 1934  5 Sheets-Sheet 1

Inventor:
Lucien SIMON
by *[signature]*
Attorneys.

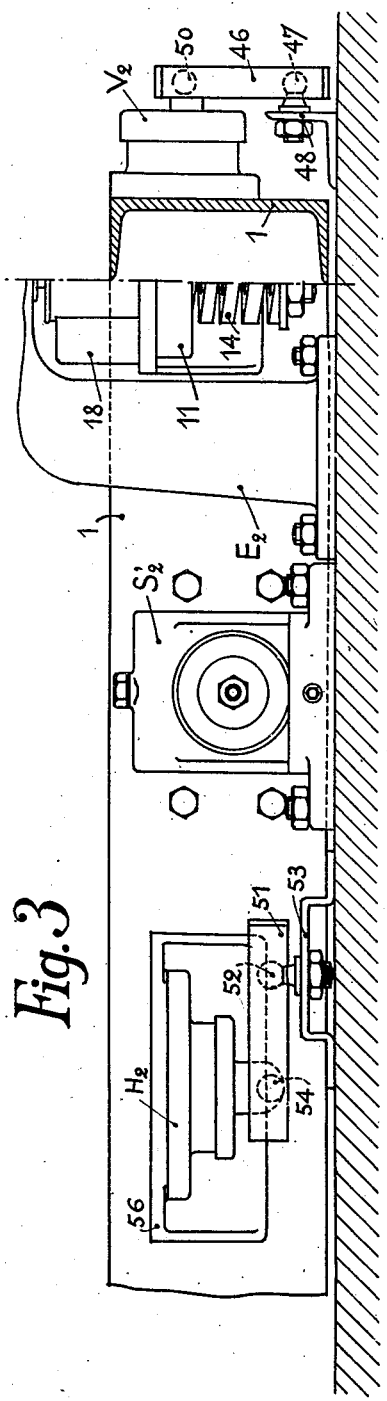
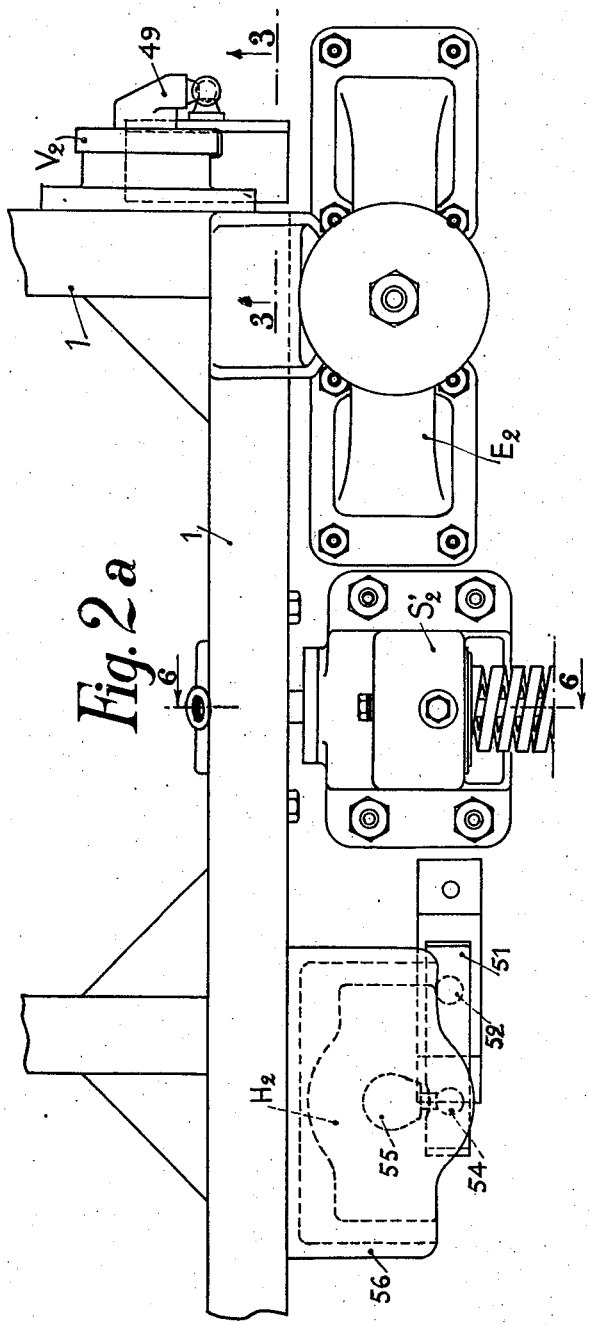

Oct. 20, 1936.  L. SIMON  2,058,185

SYSTEM FOR ABSORBING THE VIBRATIONS PRODUCED BY A MACHINE

Filed Dec. 29, 1934  5 Sheets-Sheet 3

Inventor:
Lucien SIMON
by
Attorneys.

Patented Oct. 20, 1936

2,058,185

UNITED STATES PATENT OFFICE 2,058,185

SYSTEM FOR ABSORBING THE VIBRATIONS PRODUCED BY A MACHINE

Lucien Simon, Paris, France, assignor to Societe d'Exploitation des Brevets Lucien Simon (Amortisseurs Sanchok) (Societe Anonyme), Paris, France Application December 29, 1934, Serial No. 759,764
In France July 4, 1934

3 Claims. (Cl. 248—20)

The present invention has for its object a device for absorbing the vibrations produced by power generating, receiving or transmitting plants.

It is known that these plants, either stationary or movable, transmit to their supports vibrations the consequences of which may be serious, especially as a result of resonance phenomena.

The absorbing device according to the present invention obviates these drawbacks. It is characterized in that the machine, or group of machines, in which the mechanical vibrations are generated is mounted rigid with a platform which is elastically suspended in all directions and is combined with a system of shock absorbers disposed in such manner as to limit the vibrations imparted to said platform, the degree of efficacy of these shock absorbers being preferably a function of the speed of working of the group that is considered.

According to another characteristic of the invention, I provide, between the supporting platform and the shock absorbers, or some of them, amplifying organs which are intended to amplify the oscillations and to multiply the braking power of the corresponding shock absorbers.

These, and other, features of the present invention will result from the following detailed description of some embodiments thereof.

Preferred embodiments of the present invention will be hereinafter described with reference to the accompanying drawings, given merely by way of example, and in which:

Fig. 3 is an elevational view of the structure shown by Fig. 2a, a portion at the right of this figure being shown in section on the line 3—3 of Fig. 2a;

Fig. 2a is a plan view corresponding to Fig. 2, but on an enlarged scale;

Fig. 6 is a longitudinal sectional view of a stabilizing device on the line 6—6 of Fig. 2a;

Figure 1:
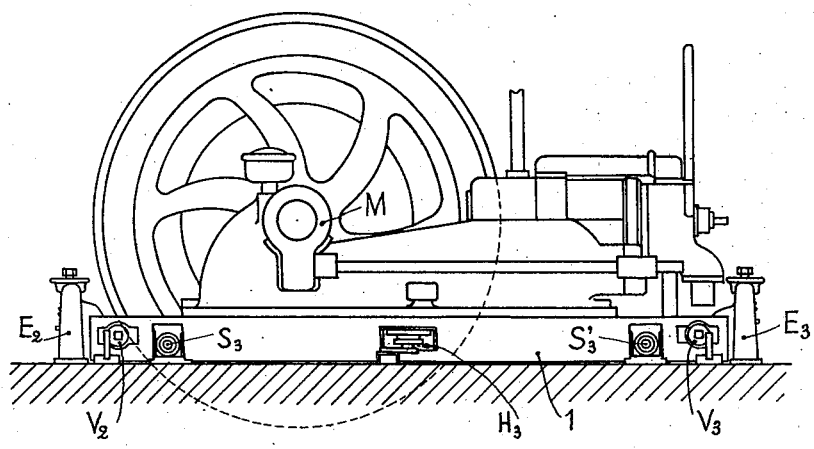
Figs. 1 and 2 show, in elevational view and in plan view respectively, the arrangement of a platform intended to support a stationary machine or group of machines.
Figure 2:
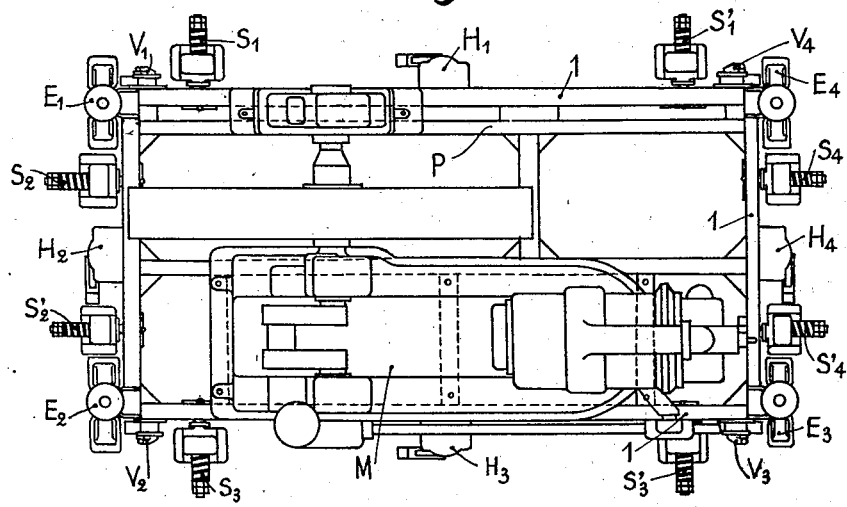

The machine M is carried by a platform the side members I of which (Figs. 1 to 2a inclusive) are supported by elastic supporting members $E^1$, $E^2$, $E^3$, $E^4$ resting on the ground.

Figure 4:
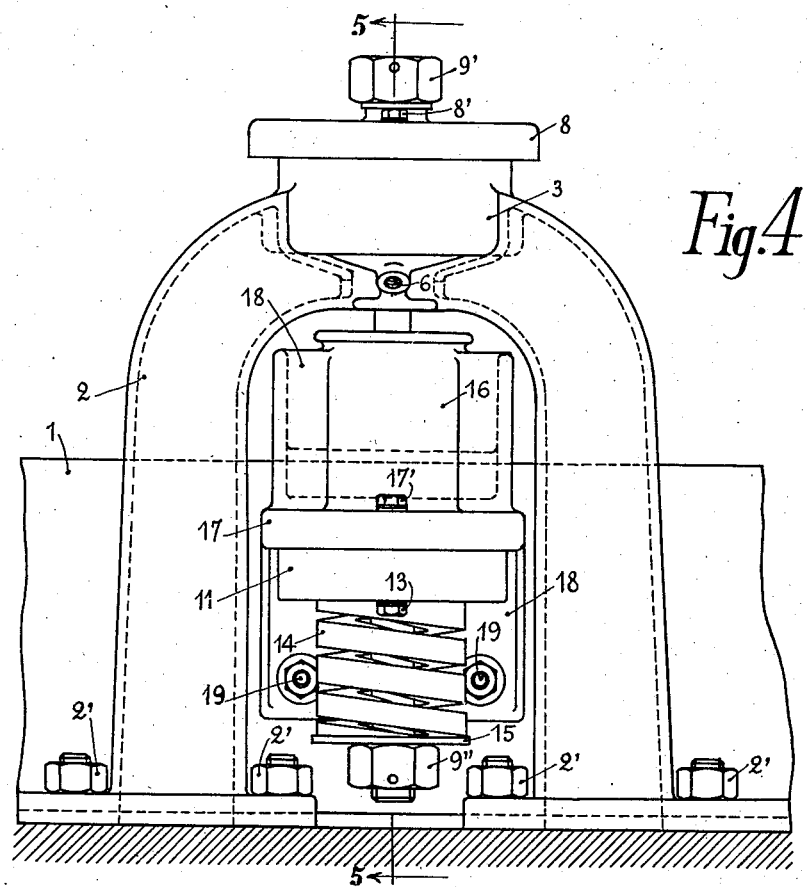
Figs. 4 and 5 are an elevational view and a vertical sectional view respectively of a support of the platform, the sectional view being taken on the line 5—5 of Fig. 4.
Figure 5:
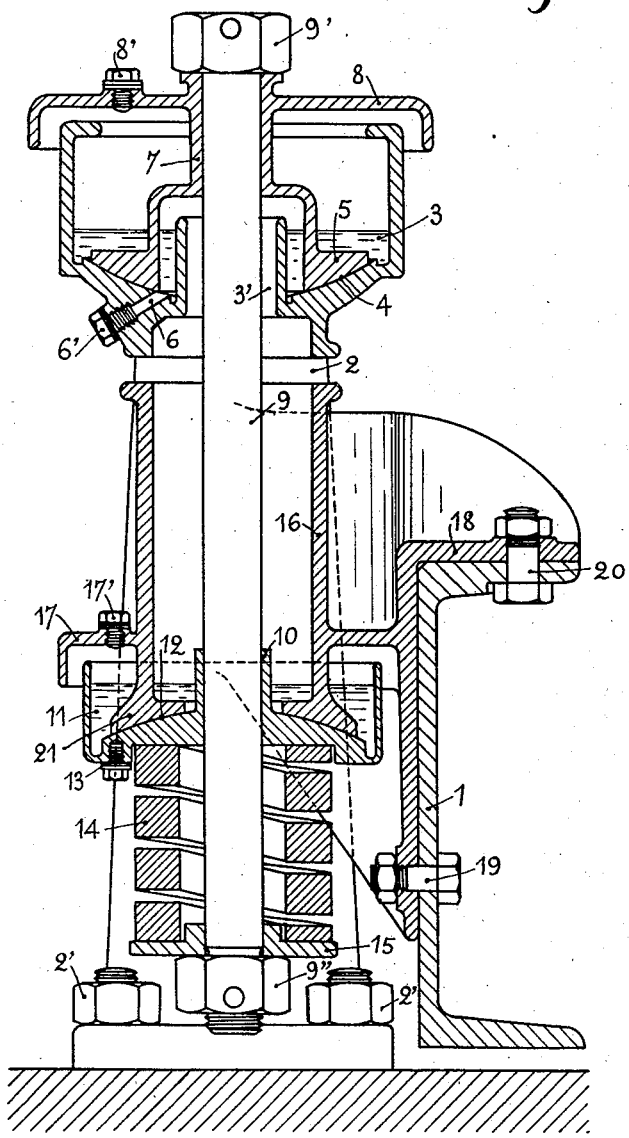

Each of these supporting elements (Figs. 4 and 5) consists of an arc-shaped support 2 fixed to the ground by nuts 2' screwing on fixation elements secured to the ground and which are not visible on the drawings. The upper portion of this support 2 constitutes an annular dished part 3 intended to contain an oil bath and provided with a discharge conduit 6 having a plug 6'. The bottom 4 of this dished part is of concave spherical shape. In the central hollow 3' of this part is engaged a cylindrical rod 9 threaded at both ends. On the upper end of this rod is screwed and locked a nut 9'. This rod 9 is engaged in a sleeve 7, rigid with a spherical annular bearing 5 intended to be immersed in the oil bath of cup 3 and to fit on the bottom 4 thereof so as to obtain a kind of ball and socket joint. Sleeve 7 also carries a lid 8, provided with a plug 8', intended to protect the oil bath of cup 3 against dirt.

On rod 9 there is also mounted a sleeve 10 shaped in such manner as to form an annular cup 11 intended to receive an oil bath and having a convex spherical bottom 12, provided with a plug 13. This sleeve is supported by a spring 14 having a plurality of turns, bearing against a plate 15 maintained in position by a nut 9'' screwed and keyed on the other end of rod 9. Longitudinal member I is fixed through bolts 19 and 20 on a bracket 18 integral with a tubular support 16 through which passes rod 9. This support is provided at its lower end with a concave spherical part 21 intended to be immersed in the oil bath of cup 11 and to fit on the bottom 12 of this cup in such manner as to form a kind of ball and socket joint. Furthermore, bracket 18 is so shaped as to form a cover 17 provided with a plug 17'. Owing to the arrangement of these elastic supporting systems, platform P oscillates vertically on springs 14 and horizontally on ball and socket joints 4—5 and 12—21. It should be noted that, in the vertical direction, the position of rest of the platform is very stable because when this platform tends to move away from or toward the ground, its weight, or the supplementary tension of the springs, tends to quickly bring it back into its position of static equilibrium.

On the contrary, in the horizontal direction, if the system is statically stable in the same manner as a pendulum, it is clear that one oscillation will take a relatively long time to be deadened under the action of the weight of the whole. In other words, the platform will not be strongly urged toward its position of equilibrium. Now this is a drawback because it is necessary, when the force that has produced a displacement of the platform from its position of equilibrium in one direction ceases to act, that the system should come back to this position of equilibrium sufficiently quickly for being in said position when a new cause of perturbation occurs. Otherwise, mechanical resonance effects would take place, with possible detrimental results.

In order to obviate this drawback, I provide horizontal stabilizing devices $S'$, $S'^1$, $S^2$, $S^{2'}$, $S^3$, $S'^3$, $S^4$, $S'^4$, disposed by pairs and in opposite relation.

Figure 6:
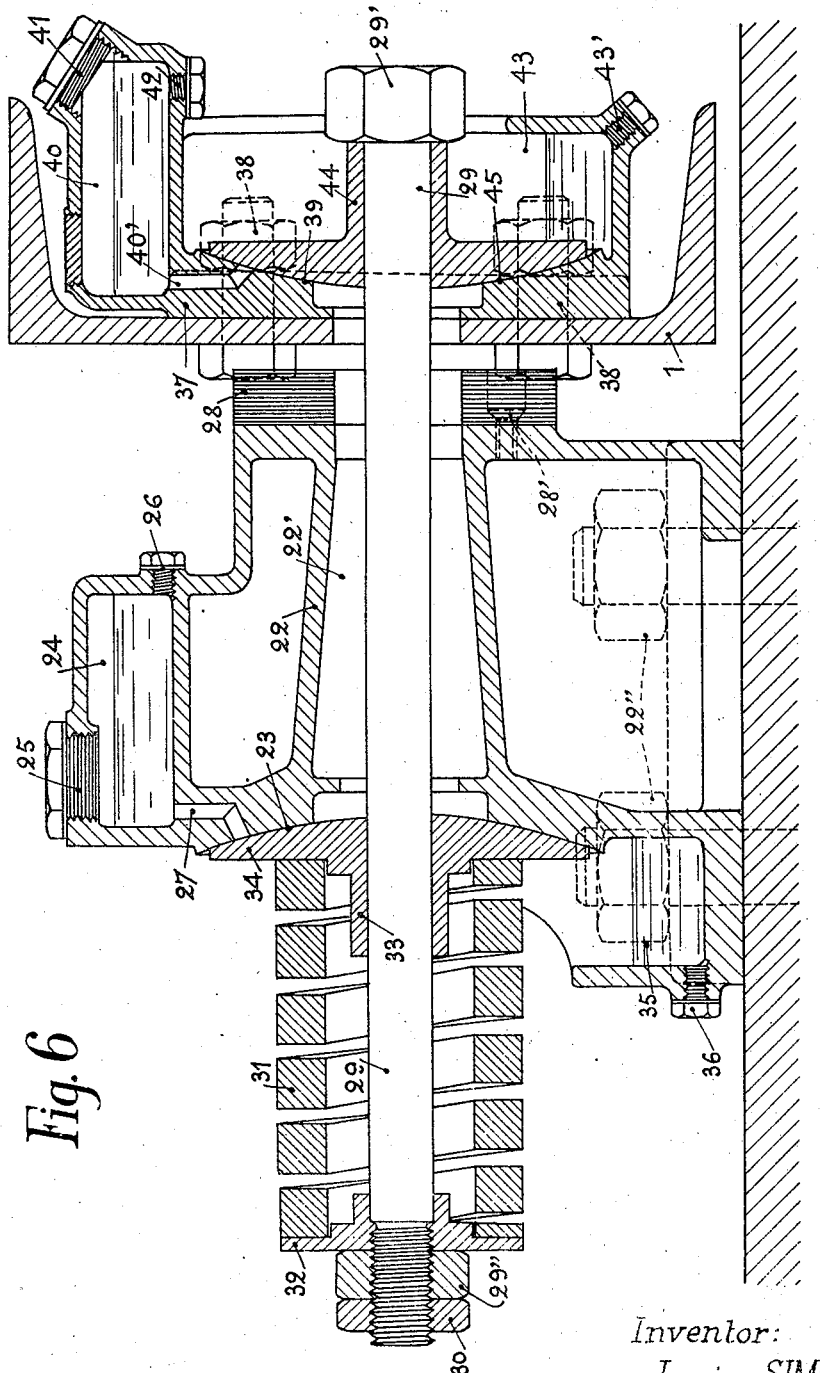

Each of these stabilizing devices consists (Fig. 6) of a piece 37 fixed to a longitudinal member 1 by means of bolts 38 and provided with a spherical cup-shaped part 39. This piece 37 is provided, at its upper part, with a chamber 40 for an oil bath, with a plug 41 for filling up this chamber and a plug 42 for emptying it. A conduit 40' conveys oil to cup 39 and, at the lower part, a reservoir 43, having a discharge plug 43' collects the lubricant. In cup 39 I fit, in such manner as to form a kind of ball and socket joint, a spherical portion 45 rigid with a sleeve 44 in which is engaged a cylindrical rod 29 both of the ends of which are screw threaded on one of which is screwed and keyed a nut 29'. This rod 29 extends through the central hole 22' of a support 22 fixed to the ground by nuts 22'' screwed on the ends of fixation members secured to the ground and which are not shown in the drawings. This support 22 is so shaped as to form a spherical cup 23 in which is swivelled a spherical bearing 34 integral with a sleeve 33 surrounding rod 29. A spring 31, bearing at one end on sleeve 33 and at the other end on a plate 32 fixed by means of nut 29'' and lock nut 30 ensures the respective contacts between parts 39—45 and 23—34, with a suitable pressure. Support 22 includes, on the one hand, a chamber 24 for an oil bath, provided with a filling plug 25 and a discharge plug 26 and with an oil inlet conduit 27, and, on the other hand, a tank 35 intended to collect the lubricant and provided with a discharge plug 36.

The edge of support 22 which is disposed close to longitudinal member 1 is further provided with a safety cushion 28 of a suitable plastic material, fixed by means of screws 28'.

When the platform is in the state of rest, the actions of the tensioned springs of the various stabilizing devices compensate one another. On the contrary, when the platform is moved away from this position of rest, this equilibrium is destroyed and the platform is promptly brought back into this position of rest by the action of said springs. The system of ball and socket joints combined with these stabilizing devices is intended to permit the vertical oscillations of the platform.

The absorption of the living force of the whole is obtained by means of two systems of shock absorbers. The first system includes shock absorbers $V^1$, $V^2$, $V^3$, $V^4$ adapted to act on the vertical oscillations. The second system includes shock absorbers $H^1$, $H^2$, $H^3$, $H^4$ intended to act on the horizontal oscillations. Of course shock absorbers might be disposed in a similar manner with a view to absorbing the rectangular components of oblique oscillations.

The fixed arm 46 of vertical shock absorber $V^2$ (Figs. 2a and 3) fixed on longitudinal member 1, is connected to a fixed point, angle iron 48 for instance, through a ball and socket joint 47 and is also connected to the movable arm 49 of the shock absorber through ball and socket joint 50. In a similar way, the fixed arm 51 of shock absorber $H^2$ fixed on longitudinal member 1 through bracket 56 is connected to a fixed point 53 through a ball and socket joint 52 and to movable arm 55 through a ball and socket joint 54.

These shock absorbers may be of any suitable type. However it appears that if, for a group of the kind described, the speed of revolution increases, certain oscillations resulting, for instance, from a lack of centrifugal balance assume an increasing importance. If the shock absorbers that are utilized have a uniform efficiency, they quickly become unable to absorb the increasing living force of these oscillations. It is therefore preferable to make use of shock absorbers the efficiency of which increases as a function of the speed of revolution of the machine supported by the platform.

The arrangement that has just been described as applied to a stationary plant is very advantageous in the case of a plant located in a town as it prevents the vibrations of the machines from being transmitted to the neighbourhood. It can also be used with advantage in the case of machines or groups of machines mounted on movable supports, such as vehicles, boats, aircrafts, etc.

It should be noted that the stabilizing devices may be dispensed with. In this case, the supporting devices above described must be suitably inclined.

On the other hand, in some cases, the transmission to the neighbourhood, either of vertical vibrations, or of horizontal vibrations, or even of vibrations in a direction at right angles to any plane may have no detrimental consequences. This is more particularly the case when the discontinuous efforts that give rise to the vibrations take place only in a well determined direction. In this case it is of course sufficient to limit the elasticity of the platform to the direction of the vibrations.

On the contrary, the use of the general device, such as it has been described, or with modifications of detail which do not change its principle, is necessary for instance when the efforts that give birth to the vibrations are in the form of polar vectors or again when they act in a non-simultaneous manner in different directions, which does not permit of composing them so as to obtain a single resultant acting on the platform.

It should also be noted that the amplitude of the oscillations of the support of the group that generates these oscillations may be amplified before transmission to the shock absorbers through any suitable device, for instance including unequal lever arms. This arrangement has the advantage of multiplying the braking effort of a given kind of shock absorber.

Figure 7:
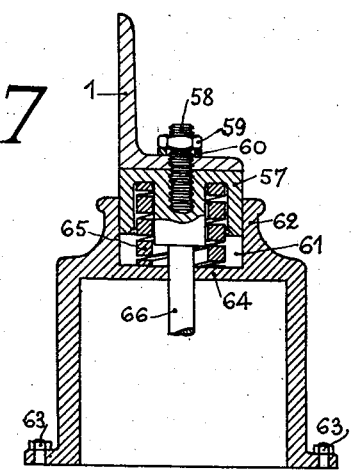
Fig. 7 is a diagrammatic vertical sectional view of a modification.

In the modification diagrammatically shown by Fig. 7, the longitudinal member 1 of the platform is connected with a piston 57 through a threaded rod 58 and a nut 59, with a ring 60 interposed between the nut and the longitudinal member. Piston 57, which is hollowed out, as shown by the drawings, is slidably mounted in a chamber 61 of cylindrical shape provided at the top of a part 62 fixed to the ground through nuts 63 screwed to the upper ends of fixation members anchored in the ground and which are not shown in the drawings. Between piston 57 and the end 64 of chamber 61, there is inserted a spring 65. The rod 66 of the piston extends through the end 64 and is connected through any suitable means with a shock absorber not shown in the drawings and intended to brake the oscillations in the vertical direction transmitted to the piston by the platform. This arrangement permits of braking and absorbing only the vertical components of the oscillations imparted to the platform by the machine or group of machines carried by said platform.

While I have, in the above description, disclosed what I deem to be preferred embodiments of the present invention, it should be well understood that I do not wish to be limited thereto as there might be changes made in the arrangement, disposition, and form of the parts as comprehended within the scope of the appended claims.

What I claim is:

1. A system for absorbing the vibrations produced by a machine, which comprises, in combination, a platform, means for rigidly fixing said machine on said platform, a plurality of supports rigidly fixed to the ground, a rod for each support, ball and socket connecting means between the upper part of said rod and the corresponding support, a part slidable on the lower part of said rod, a spring interposed between said part and the lower end of said rod, ball and socket connecting means between said part and said platform, shock absorbers between said platform and the ground for absorbing the vibrations of said platform with respect to the ground and at least two ball and socket joints interposed in series with each of said shock absorbers between said platform and the ground.

2. A system for absorbing the vibrations produced by a machine, which comprises, in combination, a platform, means for rigidly fixing said machine on said platform, a plurality of supports rigidly fixed to the ground, a rod for each support, ball and socket connecting means between the upper part of said rod and the corresponding support, a part slidable on the lower part of said rod, a spring interposed between said part and the lower end of said rod, ball and socket connecting means between said part and said platform, a plurality of members rigidly secured to the ground, elastic means between each of said members and the platform for opposing movements of said platform in a horizontal direction with respect to the ground, shock absorbers between said platform and the ground for absorbing the vibrations of said platform with respect to the ground and at least two ball and socket joints interposed in series with each of said shock absorbers between said platform and the ground.

3. A system for absorbing the vibrations produced by a machine, which comprises, in combination, a platform, means for rigidly fixing said machine on said platform, a plurality of supports rigidly fixed to the ground, a rod for each support, ball and socket connecting means between the upper part of said rod and the corresponding support, a part slidable on the lower portion of said rod, a spring interposed between said part and the lower end of said rod, ball and socket connecting means between said part and said platform, a plurality of members rigidly secured to the ground, elastic means between each of said members and the platform for opposing movements of said platform with respect to the ground in a horizontal direction, shock absorbers for absorbing the vibrations of said platform with respect to the ground, each of these shock absorbers including two parts movable with respect to each other and one of which is rigidly fixed to said platform, a ball and socket joint interposed between the other part of the shock absorber and the ground, and a ball and socket joint interposed between these two parts of the shock absorber.

LUCIEN SIMON.